(12) United States Patent
Elliott

(10) Patent No.: US 7,314,236 B2
(45) Date of Patent: Jan. 1, 2008

(54) ADJUSTABLE PIPE REPAIR CLAMP INSTALLATION TOOL

(75) Inventor: Jerry E. Elliott, Aurora, IL (US)

(73) Assignee: Cascade Waterworks Manufacturing Co., Inc., Yorkville, IL (US)

(*) Notice: Subject to any disclaimer, the term of this patent is extended or adjusted under 35 U.S.C. 154(b) by 825 days.

(21) Appl. No.: 10/608,290

(22) Filed: Jun. 27, 2003

(65) Prior Publication Data

US 2004/0183294 A1 Sep. 23, 2004

Related U.S. Application Data

(63) Continuation-in-part of application No. 10/393,820, filed on Mar. 21, 2003, now Pat. No. 6,837,522.

(51) Int. Cl.
*F16L 35/00* (2006.01)

(52) U.S. Cl. ............................ 285/39; 81/486; 269/228

(58) Field of Classification Search .................. 285/15, 285/312, 39, 33, 26, 29; 24/270; 292/113, 292/247; 81/486, 9.3; 269/228, 268
See application file for complete search history.

(56) References Cited

U.S. PATENT DOCUMENTS

| | | | | |
|---|---|---|---|---|
| 378,449 | A | | 2/1888 | Kendall |
| 1,445,286 | A | * | 2/1923 | Bosco ......................... 269/228 |
| 1,619,749 | A | * | 3/1927 | Murray ....................... 269/228 |
| 1,885,128 | A | * | 11/1932 | Montgomery ................ 24/270 |
| 2,801,873 | A | | 8/1957 | Faughnder |
| 3,112,948 | A | | 12/1963 | Burns |
| 4,413,388 | A | | 11/1983 | Akhtar-Khavari et al. |
| 4,893,393 | A | | 1/1990 | Marshall |
| 5,228,181 | A | | 7/1993 | Ingle |

* cited by examiner

*Primary Examiner*—Aaron Dunwoody
(74) *Attorney, Agent, or Firm*—Wildman, Harrold, Allen & Dixon LLP

(57) ABSTRACT

A manually operated tool engages and draws towards one another opposed spaced flanges of a repair clamp disposed about a leaking pipe for moving the clamp into position and securely maintaining the clamp on the pipe over the leak allowing plural nut and bolt combinations on the clamp to be tightened in sealing off the leak. A movable handle has attached thereto first and second pivoting arms adapted for respectively engaging a slot within the clamp's first edge flange and the outer edge of the clamp's second opposed edge flange when the handle is in a first non-use position. Moving the handle to a second use position urges the clamp's edge flanges toward one another drawing the clamp securely about the pipe, allowing the clamp's nut and bolt combinations to be tightened. The tool is adjustable for use with a wide range of clamp sizes and pipe diameters.

40 Claims, 8 Drawing Sheets

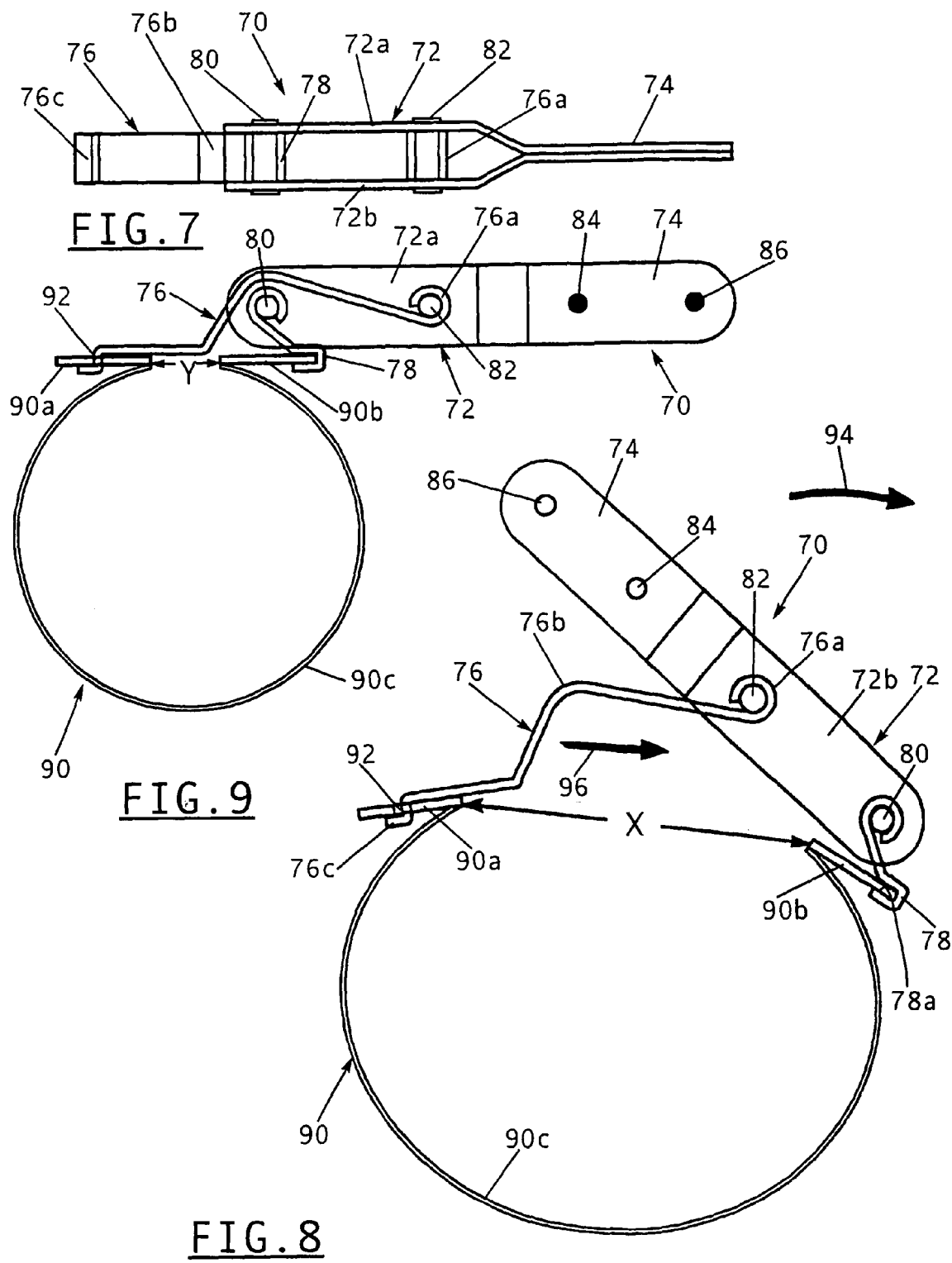

ADJUSTABLE PIPE REPAIR CLAMP INSTALLATION TOOL

CROSS REFERENCE TO RELATED APPLICATION

This application is a continuation-in-part of U.S. patent application Ser. No. 10/393,820 filed on Mar. 21, 2003, and issued on Jan. 4, 2005 as U.S. Pat. No. 6,837,522.

FIELD OF THE INVENTION

This invention relates generally to fluid carrying conduits, or pipes, and is particularly directed to a leaking pipe and a tool for facilitating the positioning of a repair clamp on the pipe for sealing off the leak. The tool is adjustable to accommodate various clamp sizes and pipe diameters.

BACKGROUND OF THE INVENTION

Fluid carrying pipes are subject to leakage caused by damage or deterioration over time. When the leak in the pipe is readily accessible, repairing the leak is fairly straightforward. However, when the leaking pipe is buried in the ground or is otherwise not readily accessible, it is frequently difficult not only to locate the leak, but to repair the pipe and seal off the leak.

Repairing a leaking pipe typically involves positioning a clamp over the leak. The clamp is slipped over the pipe and facing end portions of the clamp are tightly drawn together typically by nut and bolt combinations. The repair clamp is typically comprised of high strength steel and is frequently difficult to position on the pipe and draw the opposed ends of the clamp together so that the clamp is securely positioned on the pipe because of the tendency of the clamp ends to pull away from one another due to tension in the clamp. This task also typically involves positioning a gasket comprised of a suitable sealing material between the fluid-carrying pipe and the repair clamp. This task is frequently made extremely difficult by leakage of the fluid from the pipe and may even be highly dangerous when dealing with hazardous materials. In addition, because of the difficulty in excavating around the pipe without damaging the pipe, access to the leaking portion of the pipe is typically very restricted and this further complicates and renders more difficult the task. Finally, because of the leaking fluid, the underground location, and the structure of the repair clamp, the clamp installer is subject to injury.

The present invention addresses the difficulties encountered in the prior art by providing a manually operated tool which facilitates the positioning of a pipe repair clamp about a leaking pipe for sealing off the leak. The pipe repair clamp installation tool can be operated with the use of only one hand allowing the installer to use the other hand for proper positioning of the clamp on the pipe. Once the repair clamp is properly positioned on the pipe, the installation tool securely maintains the repair clamp in position over the leak allowing for the tightening of nut and bolt combinations which draw the clamp tightly about the pipe in sealing off the leak. The installation tool is adjustable in size to accommodate a wide range of repair clamp dimensions and pipe diameters.

OBJECTS AND SUMMARY OF THE INVENTION

Accordingly, it is an object of the present invention to facilitate the secure positioning of a repair clamp on a leaking pipe allowing the clamp to be tightened to seal off the leak.

It is another object of the present invention to provide a tool which facilitates the positioning of a repair clamp on a leaking pipe and the tightening of the clamp over the leak to seal the pipe.

Yet another object of the present invention is to provide a manually operated tool which tightens a high strength repair clamp on a leaking pipe, allowing the clamp to be moved in position over the leak and securely tightened to seal off the leak, followed by removal of the tool from the clamp.

A further object of the present invention is to facilitate installation of a repair clamp on a leaking pipe where only limited access to the leak is available such as in an underground pipeline.

A still further object of the present invention is to provide an adjustable tool for installing a repair clamp on a pipe which is adapted for use with a wide range of repair clamp sizes and pipe diameters.

This invention contemplates apparatus for installing a repair clamp on a pipe, where the repair clamp includes a generally cylindrical body having first and second opposed edge flanges, a slot extending the length thereof for receiving the pipe and positioning the repair clamp about an outer circumference of the pipe, and plural nut and bolt combinations coupled to the clamp's edge flanges for drawing the repair clamp tightly about the pipe. The apparatus comprises a body portion having first and second opposed ends; an arm having a first end pivotally coupled to the body portion adjacent the first end thereof, the arm further including a second opposed end adapted for insertion in an aperture in the first edge flange of the repair clamp; a clasp pivotally coupled to the body portion intermediate the first and second opposed ends thereof and adapted to engage an outer edge of the repair clamp's second edge flange when the body portion is in a first position relative to the arm and clasp and the repair clamp is loosely disposed about the pipe, wherein pivoting displacement of the body portion about the arm and clasp to a second position draws the repair clamp's edge flanges together for securely maintaining the repair clamp on the pipe and allowing the nut and bolt combinations to be tightened for securing the repair clamp to the pipe in a sealed manner; and an adjustable mechanism coupling the clasp to the body portion for adjusting spacing between the arm and the clasp to accommodate a range of sizes of the repair clamp and diameters of the pipe.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 7 is a bottom plan view of another embodiment of a pipe repair clamp installation tool in accordance with the present invention;

FIG. 8 is a sectional view showing the manner in which the pipe repair clamp installation tool of the present invention engages first and second opposed edge flanges of a pipe repair clamp prior to the application of a clamping force by the tool on the clamp; and FIG. 9 is a sectional view showing the engagement of a pipe repair clamp by the pipe repair clamp installation tool of the present invention after the tool has been moved to the clamping position for maintaining the clamp securely in position on a leaking pipe;

DETAILED DESCRIPTION OF THE PREFERRED EMBODIMENTS

Figure 1:
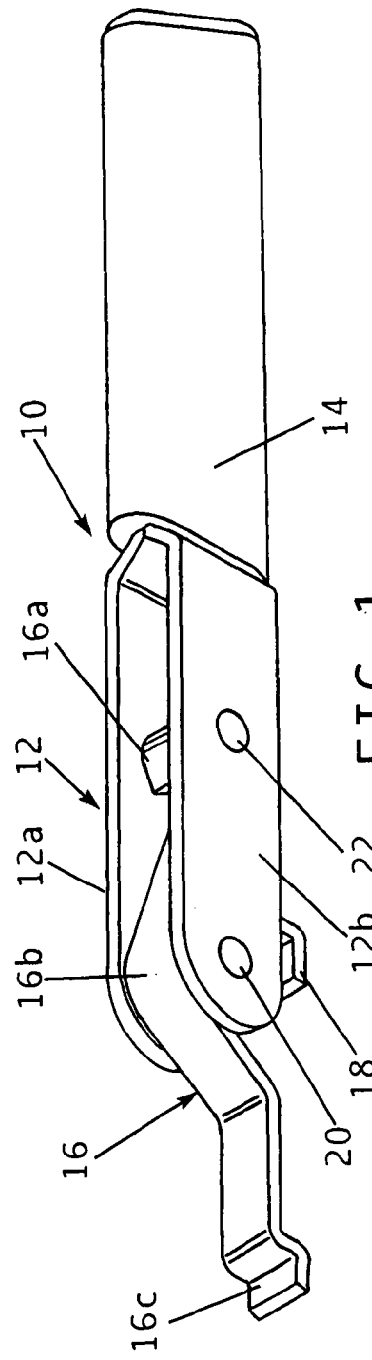
FIG. 1 is a perspective view of a pipe repair clamp installation tool in accordance with the principles of the present invention.
Figure 2:
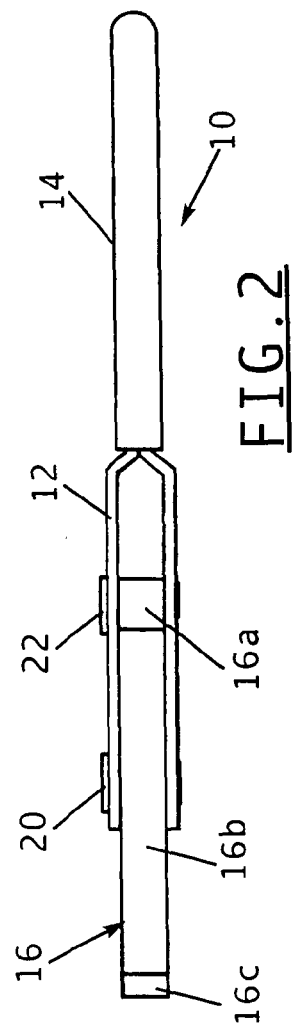
FIG. 2 is a top plan view of the pipe repair clamp installation tool shown in FIG. 1.
Figure 3:
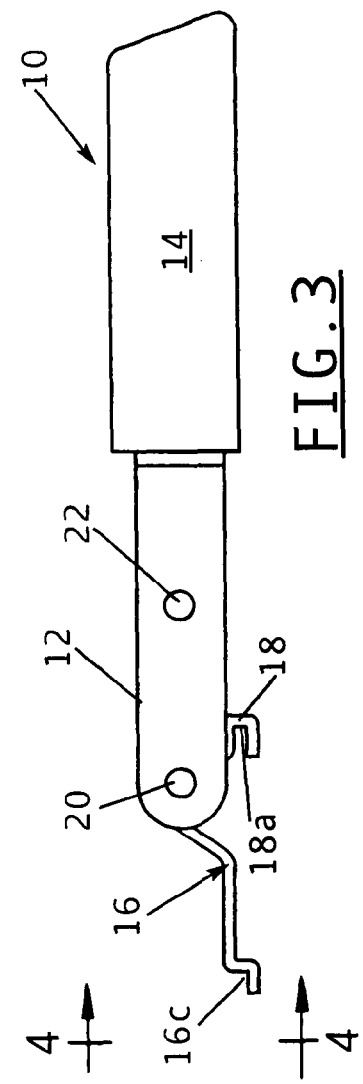
FIG. 3 is a side elevation view of the pipe repair clamp installation tool shown in FIG. 1.
Figure 4:
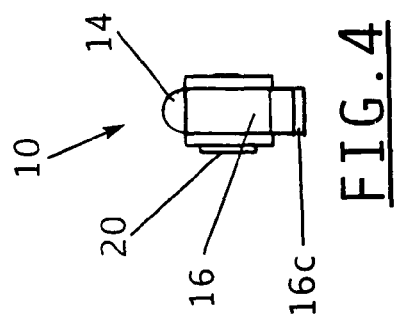
FIG. 4 is an end-on view of the pipe repair clamp installation tool shown in FIG. 3 taken along sight line 4-4 therein.

Referring to FIG. 1, there is shown a perspective view of one embodiment of a pipe repair clamp installation tool 10 in accordance with the principles of the present invention. A top plan view of the pipe repair clamp installation tool 10 is shown in FIG. 2, while a side elevation view of the pipe repair clamp installation tool is shown in FIG. 3. FIG. 4 is an end-on view of the pipe repair clamp installation tool 10 shown in FIG. 3 taken along sight line 4-4 therein.

The repair clamp installation tool 10 includes a central body 12 having disposed on one end thereof a handle 14. The central body 12 includes a pair of spaced, generally parallel arms 12a and 12b. Inserted through and extending between the first and second arms 12a and 12b of the central body 12 are first and second pivot/coupling pins 20 and 22. The first and second pivot/coupling pins 20 and 22 are securely connected to the central body's first and second arms 12a and 12b. The repair clamp installation tool 10 further includes a pivot arm 16 and an edge engaging clasp 18. Pivot arm 16 includes a clamp end 16a, a curved center portion 16b and a hook end 16c. The clamp end 16a of the pivot arm 16 is disposed about and attached to the second pivot/coupling pin 22. The pivot arm's clamp end 16a allows the pivot arm to freely pivot about the second pivot/coupling pin 22. An edge engaging clasp 18 is disposed about and pivotally coupled to the first pivot/coupling pin 20. In the configuration of the pipe repair clamp installation tool 10 shown in FIGS. 1-4, the curved center portion 16b of the pivot arm 16 is disposed upon a curved portion of the edge engaging clasp 18 which is disposed about the first pivot/coupling pin 20. The hook end 16c of the pivot arm 16 includes two 90° turns so as to form a step-like arrangement. As shown in FIG. 3, the distal end of the edge engaging clasp 18 includes a recessed slot 18a which is adapted to engage an outer edge of an edge flange of a repair clamp is described below. The tool's central body 12, pivot arm 16, edge engaging clasp 18, and first and second pivot/coupling pins 20, 22 are preferably comprised of high-strength steel. The tool's handle 14 is preferably comprised of rubber or an elastomeric material to facilitate manual gripping and manipulation. In the embodiment shown in FIGS. 1-4, the first and second arms 12a, 12b of the tool's central body 12 extend into and are securely coupled to the tool's handle 14.

Figure 5:
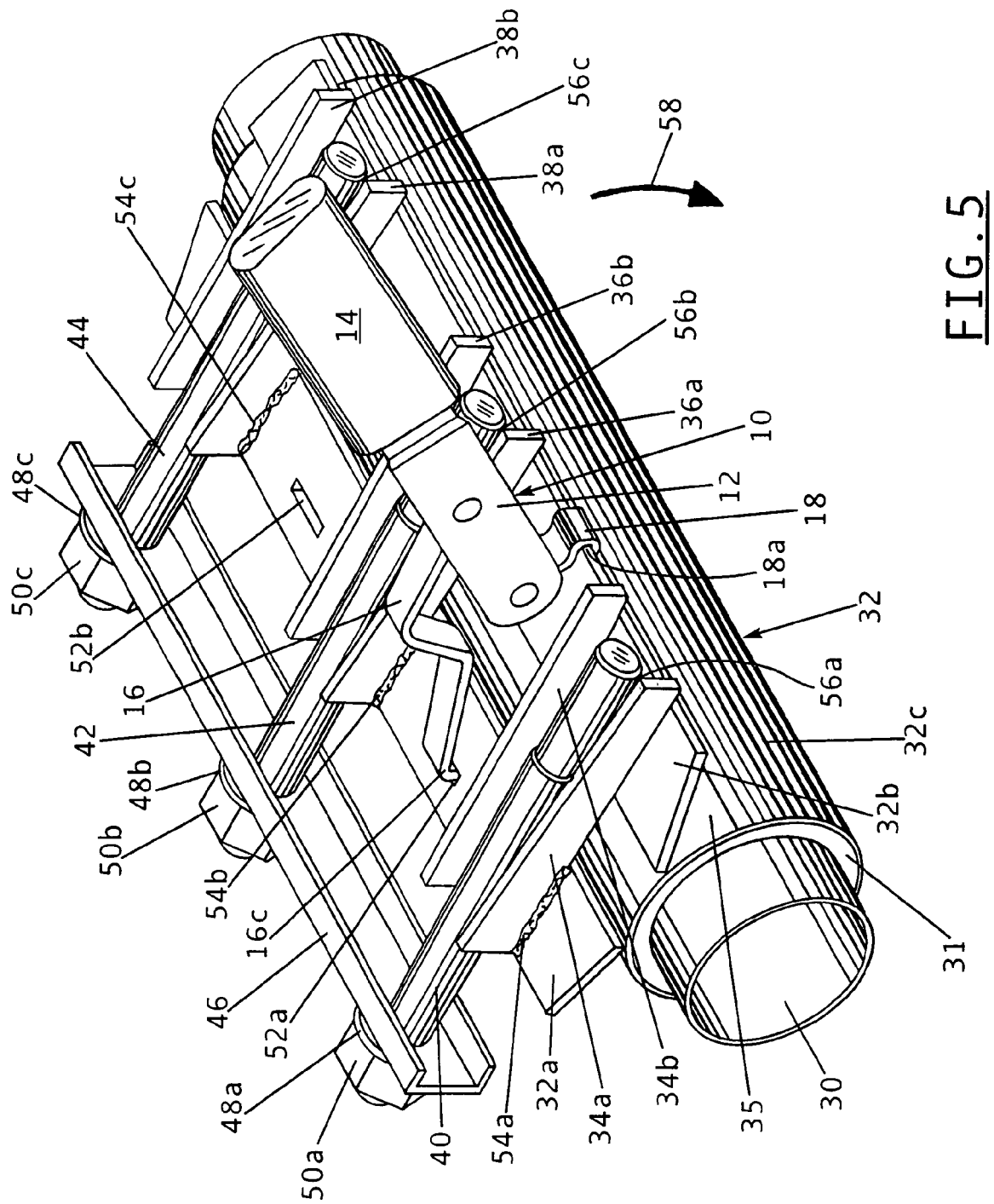
FIG. 5 is a perspective view showing the pipe repair clamp installation tool of the present invention engaging opposed edge flanges of a repair clamp positioned on a leaking pipe prior to moving the tool to the clamping position.

Referring to FIG. 5, there is shown a perspective view of the inventive pipe repair clamp installation tool 10 and the manner in which it is used to secure a repair clamp 32 to a leaking pipe 30. Repair clamp 32 includes a generally cylindrical body portion 32c having first and second opposed edge flanges 32a and 32b extending the length of the repair clamp. Each of the first and second edge flanges 32a and 32b of the repair clamp 32 is generally flat and is formed integrally with the clamp's body portion 32c. Repair clamp 32 is shown disposed about a pipe 30, with a liner 31 positioned between and in contact with the outer surface of the pipe and the inner surface of the repair clamp. Repair clamp 32 does not extend fully around the circumference of pipe 30 and thus there is a gap between the clamp's first and second edge flanges 32a, 32b. Inserted between the liner 31 and adjacent portions of the inner surface of the clamp's body portion 32c and spanning the gap between the clamp's first and second edge flanges 32a, 32b is a clamp insert 35. Clamp insert 35 has generally the same curvature as the clamp's body portion 32c and extends the length of the repair clamp 32. The combination of the repair clamp's body portion 32c and the clamp insert 35 engages the liner 31 about its entire outer circumference and maintains the liner in intimate contact with the outer surface of the pipe 30 about the liner's entire inner circumference and length. Liner 31 preferably has an elastomeric composition or is comprised of rubber. The pipe repair clamp 32 is preferably comprised of a high strength, corrosion resistant steel. The width of the gap between the clamp's first and second edge flanges 32a and 32b is such that the repair clamp 32 may be easily slipped over the leaking pipe 30 being repaired. Thus, once the repair clamp 32 is disposed on the pipe 30, considerable force must be used to draw the opposed first and second edge flanges 32a, 32b of the repair clamp 32 toward one another to establish a sealed relationship between the liner 31 and repair clamp 32 combination and the inner fluid-carrying pipe. The inventive repair clamp 32 facilitates the application of this force in drawing the combination of the inner liner 31 and the inventive repair clamp 32 in contact with the outer surface of pipe 30 as described in the following paragraphs.

Figure 6:
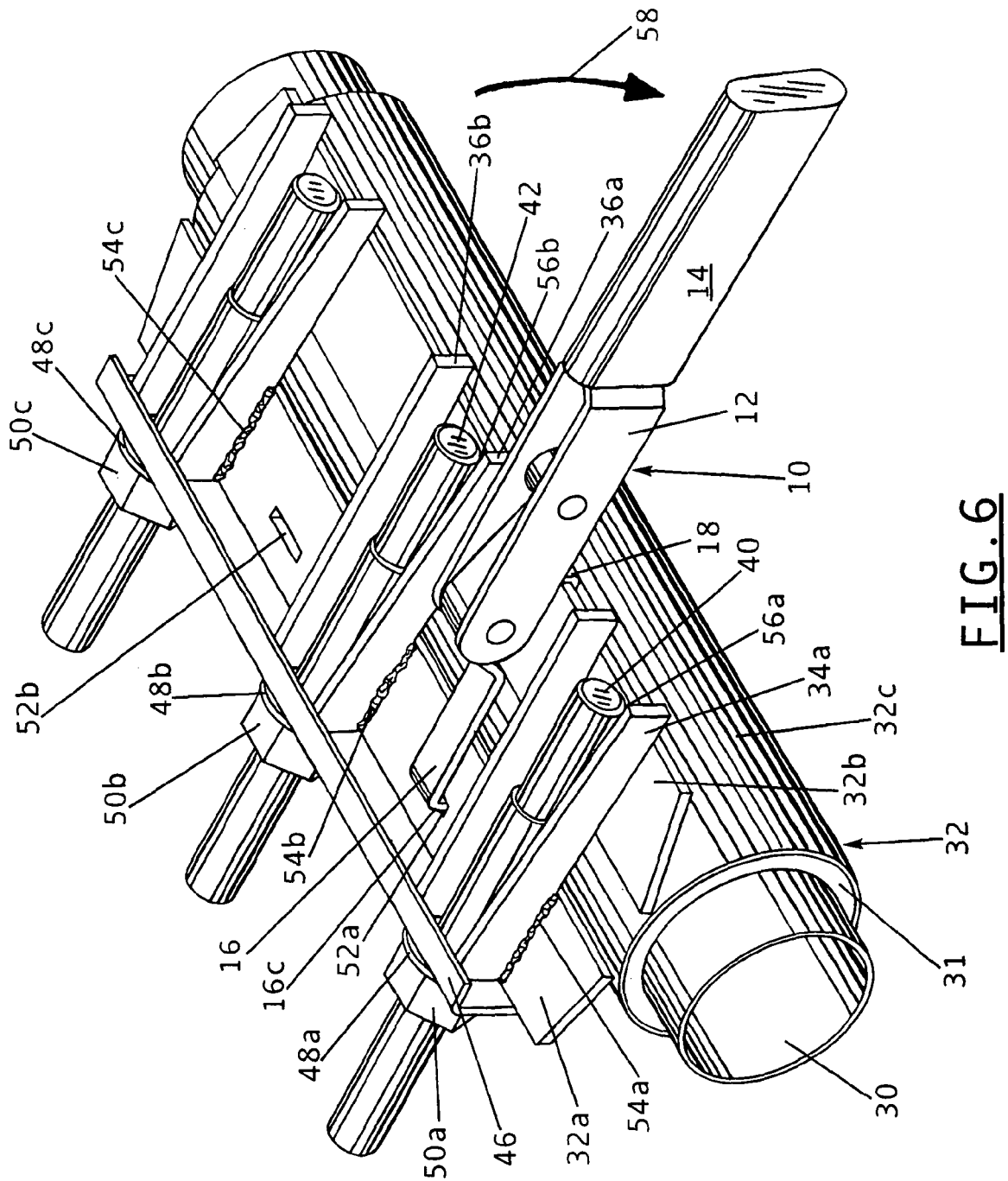
FIG. 6 is a perspective view of the pipe repair clamp installation tool of the present invention engaging opposed edge flanges of a pipe repair clamp disposed on a leaking pipe, with the installation tool moved to the clamping position for securely maintaining the repair clamp in position on the pipe.

Attached to the clamp's first edge flange 32a by means of respective weldments 54a is a first pair of ribs 34a and 34b. A second pair of ribs 36a and 36b is similarly attached to the clamp's first edge flange 32a by means of weldments 54b. Finally, a third pair of ribs 38a and 38b is securely attached to the clamp's first edge flange 32a by means of weldments 54c. Similarly, attached to the clamp's second edge flange 32b by means of weldments 56a, 56b and 56c are first, second and third bolts 40, 42 and 44. The first bolt 40 is aligned with and disposed between the first pair of ribs 34a, 34b which are attached to the clamp's first edge flange 32a. Similarly, the second and third bolts 42 and 44 are respectively disposed between and aligned with the second pair of ribs 36a, 36b and the third pair of ribs 38a, 38b. Each of the first, second and third bolts 40, 42 and 44 includes a distal threaded end portion which extends outwardly from the pair of spaced ribs between which the bolt is positioned. A clamping bracket 46 includes three spaced apertures each of which is adapted to receive the threaded end of one of the first, second and third bolts 40, 42 and 44. Each of the threaded end portions of the first, second and third bolts, 40, 42 and 44, is adapted to receive and engage a respective nut 50a, 50b and 50c. Tightening of the three nuts 50a, 50b and 50c on the three bolts 40, 42 and 44, respectively, moves the clamping bracket 46 towards the repair clamp 32 and into contact with the distal ends of the three pairs of ribs 32a, 32b and 36a, 36b and 38a, 38b, as shown in FIG. 6. Each of the paired ribs of the clamping bracket 46 and the three nuts 50a, 50b and 50c is preferably comprised of a high strength, corrosion-resistant steel, as are each of the three bolts 40, 42 and 44. Disposed between each of the three nuts 50a, 50b and 50c and the clamping bracket 46 is a respective nylon washer 48a, 48b and 48c.

As shown in FIG. 5, the clamp's first edge flange 32a is provided with first and second spaced slots, or eyes, 52a and 52b. Also as shown in FIG. 5, the hook end 16c of the repair clamp installation tool's pivot arm 16 is inserted within the first slot 52a within the clamp's first edge flange 32a. The pivot arm's hook end 16c could as easily be inserted within the second slot 52b within the repair clamp's first edge flange 32a for proper operation of the clamp as described below. With the hook end 16c of the clamp's pivot arm 16 inserted within the first slot 52a in the clamp's first edge flange 32a, a slot 18a in the repair clamp installation tool's edge engaging clasp 18 is positioned over and in contact with an outer edge of the repair clamp's second edge flange 32b. The distance between the first slot 52a and the outer edge of the clamp's second edge flange 32b depends upon the size of the clamp and the normal, unstressed distance between the clamp's first and second edge flanges 32a and 32b. The distance between the repair clamp installation tool's pivot arm hook end 16c and its edge engaging clasp 18 may be adjusted by the orientation of the tool's central body 12 relative to the pivot arm's hook edge and the tool's edge engaging clasp. For example, rotating the combination of the repair clamp installation tool's central body 12 and handle 14 in the direction of arrow 58 shown in FIG. 5 draws the pivot arm's hook end 16c and the tool's edge engaging clasp 18 toward one another. Similarly, rotation of the combination of the repair clamp installation tool's central body 12 and handle 14 in a direction opposite to that of arrow 58 will cause increased separation between the pivot arm's hook end 16c and the tool's edge engaging clasp 18 to provide increased spacing between the first and second edge flanges 32a, 32b of the repair clamp 32. Once in the position shown in FIG. 5, the repair clamp installation tool 10 will remain in this position because it is attached to the pipe clamps edge flanges 32a, 32b.

Referring to FIG. 6, there is shown a perspective view of the configuration of the repair clamp installation tool 10 for drawing the repair clamp's first and second edge flanges 32a and 32b toward one another for reducing the size of the gap between these edge flanges and securely positioning the repair clamp 32 on pipe 30. In FIG. 6, the repair clamp installation tool's central body 12 and handle 14 have been rotated in the direction of arrow 58 so as to be generally aligned with the tool's pivot arm 16. Rotation of the tool's central body 12 in the direction of arrow 58 reduces the separation between the pivot arm's hook end 16c and the tool's edge engaging clasp 18 so as to drawn the repair clamp's first and second edge flanges 32a, 32b toward each other, reducing the gap between these two edge flanges. This draws the repair clamp 32 and inner liner 31 more tightly about pipe 30. With the repair clamp installation tool's central body 12 in general alignment with its pivot arm 16, the repair clamp installation tool 10 maintains the repair clamp 32 in compression about the inner liner 31 disposed on the pipe 30. The repair clamp installation tool's central body 12 will remain in the locked position shown in FIG. 6 without requiring the application of force to either the tool's central body 12 or its handle 14. This allows the repair clamp installer to use both hands, if necessary, to properly position the clamp's clamping bracket 46 on the three bolts 40, 42 and 44 and tighten the three nuts 50a, 50b respectively on bolts 40, 42 and 44. In order to release the repair clamp installation tool 10 from the repair clamp 32, the tool's body portion 32c and handle 14 must be moved in a direction opposite to that of arrow 58.

Referring to FIG. 7, there is shown a bottom plan view of another embodiment of a repair clamp installation tool 70 in accordance with the principles of the present invention. The repair clamp installation tool 70 includes a central body 72 having first and second connected arms 72a and 72b. Adjacent first ends of the first and second arms 72a, 72b form a handle 74. Adjacent a second end of the central body 72, the first and second arms 72a, 72b are arranged in a spaced manner and are connected together by means of first and second pivot/coupling pins 80 and 82. Repair clamp installation tool 70 further includes a pivot arm 76 having a first clamp end 76a disposed about and attached to the second pivot/coupling pin 82. A second, opposed end of the pivot arm 76 is provided with a hook 76c, while a curved center portion 76b of the pivot arm couples the clamp end 76a with the hook end. An edge engaging clasp 78 is disposed about and coupled to the first pivot/coupling pin 80 disposed on a second end of the tool's central body 72.

Referring to FIG. 8, there is shown a sectional view of the repair clamp installation tool 70 engaging a pipe repair clamp 90 in accordance with the present invention. The handle 74 of the repair clamp installation tool 70 is formed by connecting adjacent portions of the tool's arms by means of a pair of coupling pins, or rivets, 84 and 86. In addition, the hook end 76c of the tool's pivot arm 76 is inserted in a slot, or eye, 92 within a first edge flange 90a of a pipe repair clamp 90. Similarly, a slot 78a within the edge engaging clasp 78 engages the outer edge of the second edge flange 90b of the repair clamp 90. The repair clamp 90 further includes a generally cylindrical body portion 90c having the first and second edge flanges 90a and 90b. The orientation of the repair clamp installation tool 70 and relative position of its first and second pivot/coupling pins 80, 82 respectively coupled to the pivot arm 76 and the edge engaging clasp 78 shown in FIG. 8 is such as to maximize the distance "X" between the edge engaging clasp and the distal hook end 76c of the pivot arm. The orientation of the repair clamp installation tool 70 relative to the repair clamp 90 is such that the tool merely engages the first and second edge flanges 90a, 90b of the repair clamp without applying an inwardly directed force for drawing the two edge flanges together. In order to apply a compressive force by the repair clamp installation tool 70 to the repair clamp 90, the tool's central body 72 must be rotationally displaced about the second pivot/coupling pin 82 in the direction of arrow 94 shown in FIG. 8. This results in displacement of the repair clamp installation tool's pivot arm 76 in the direction of arrow 96 and a narrowing of the gap between the repair clamp's first and second edge flanges 90a and 90b.

Referring to FIG. 9, there is shown a longitudinal sectional view of the repair clamp installation tool 79 taken from the direction opposite to the sectional view of FIG. 8, wherein the repair clamp installation tool has been displaced to the pipe engaging position. In the arrangement shown in FIG. 9, the distance between the repair clamp's first and second edge flanges 90a and 90b has been reduced to a distance "Y", where Y<X, and the combination of the repair clamp 90 and a liner (not shown) securely engages the outer surface of a pipe (also not shown).

Figure 10:
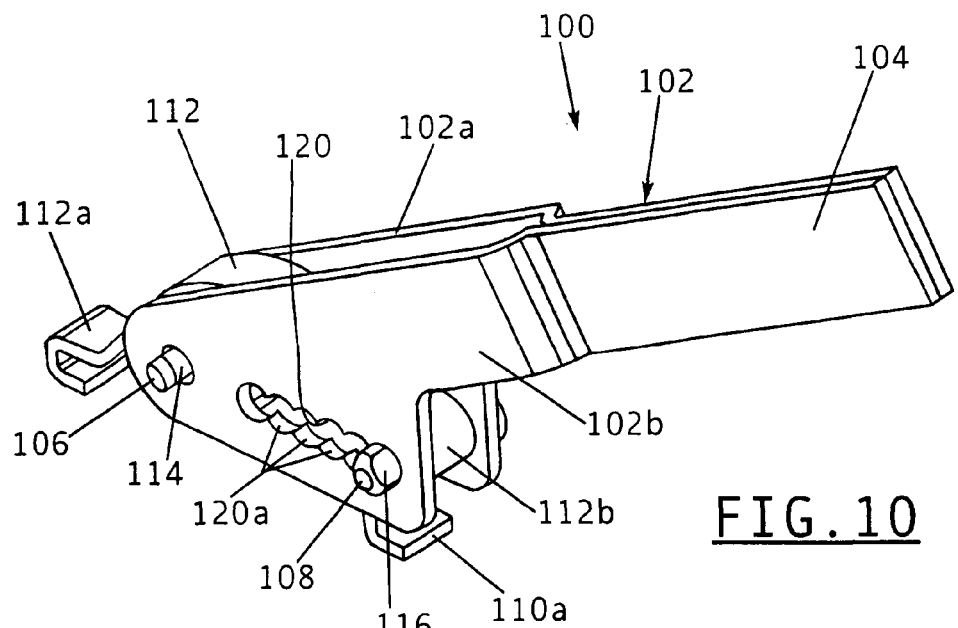
FIG. 10 is a perspective view of an adjustable pipe repair clamp installation tool in accordance with another embodiment of the present invention.
Figure 11:
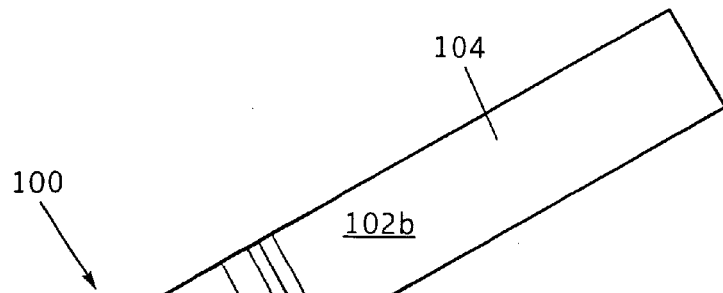
FIG. 11 is a side elevation view of the inventive adjustable pipe repair clamp installation tool shown in FIG. 10.

Referring to FIG. 10, there is shown a perspective view of an adjustable pipe repair clamp installation tool 100 in accordance with another embodiment of the present invention. A side elevation view of the inventive adjustable pipe repair clamp installation tool 100 is shown in FIG. 11, while a perspective view of one of the elongated members 102b forming the installation tool's central body is shown in FIG. 12.

The adjustable pipe repair clamp installation tool 100 includes a central body 102 formed of a pair of connected elongated members 102a and 102b. The first and second members 102a, 102b are preferably comprised of a high strength material such as steel and are joined by conventional means such as weldments (not shown for simplicity). First ends of the first and second members 102a, 102b are joined together to form a handle 104. Second opposed ends of the first and second members 102a, 102b are disposed in spaced relation so that various components of the installation tool may be positioned between and connected to first and second members as described below.

Figure 12:
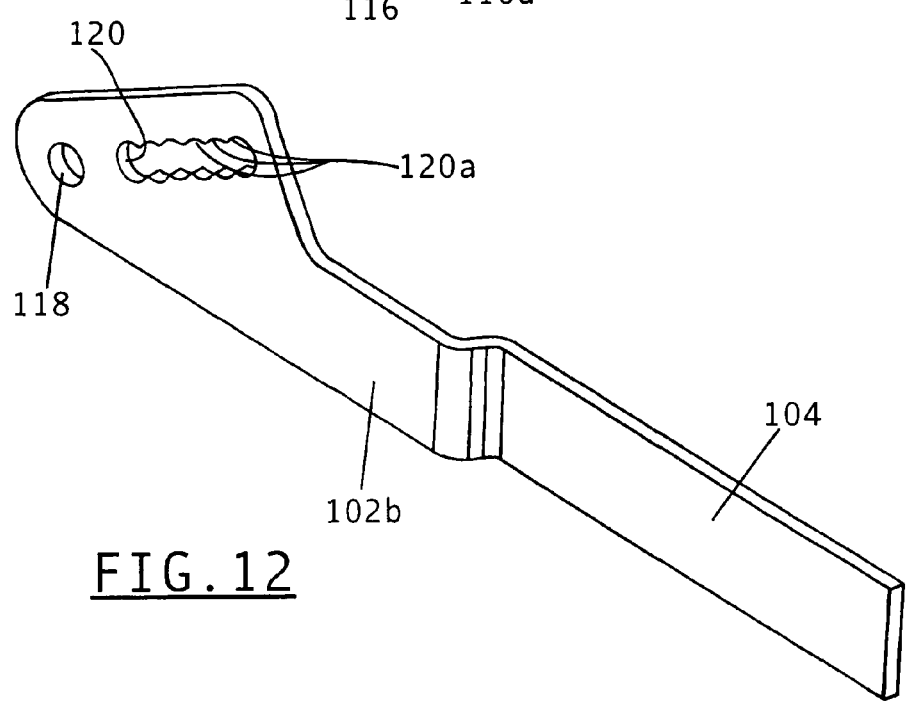
FIG. 12 is a perspective view of one of the elongated members forming the central body of the adjustable pipe repair clamp installation tool of the present invention.

Each of the first and second elongated members 102a, 102b is provided with a generally circular aperture 118 and an elongated aperture, or slot, 120 as shown for the case of the second member 102b in FIG. 12. Disposed along the length of the slot 120 are first and second arrays of plural spaced concave recesses 120a. A first pivot/coupling pin 106 is inserted through the aligned circular apertures 118 in the first and second elongated members 102a, 102b. A nut 114, or other connecting element, is attached to each end of the first pivot/coupling pin 106 for securely attaching the pin to the first and second members 102a, 102b. Similarly, a second pivot/coupling pin 108 is inserted through the aligned elongated slots 120 in each of the first and second members 102a, 102b. Attaching lugs 116 are affixed to opposed ends of the second pivot/coupling pin 108 for connecting the second pivot/coupling pin to the combination of the first and second members 102a, 102b.

The adjustable repair clamp installation tool 100 further includes a first pivot arm 110 and a second pivot arm 112. The first pivot arm 110 includes a first clamp end 110a and a second hook end which is not shown in the figures. The second hook end of the first pivot arm 110 is disposed about and connected to the first pivot/coupling pin 106 and allows the first pivot arm to be pivotally displaced about the first pivot/coupling pin. The second pivot arm 112 is curvilinear in shape and includes a first clamp end 112a and a second opposed hook end 112b. The second pivot arm's clamp end 112a is adapted for secure attachment to the edge of a flange of a pipe repair clamp as described in detail below, while its second hook end 112b is disposed about and attached to the second pivot/coupling pin 108. The second pivot arm 112 is thus free to pivot about the second pivot/coupling pin 108.

Referring to FIGS. 13, 14, 15 and 16, there are shown a series of perspective views of the adjustable repair clamp installation tool 100 in various positions of engagement with a pipe repair clamp 130 in attaching the pipe repair clamp to a pipe 122 in accordance with the present invention. A liner is typically installed between the pipe repair clamp 130 and pipe 122, and in some cases a metal insert or sleeve may be positioned between the clamp and pipe, but these are not shown in the figures because they are not part of the present invention.

Figure 13:
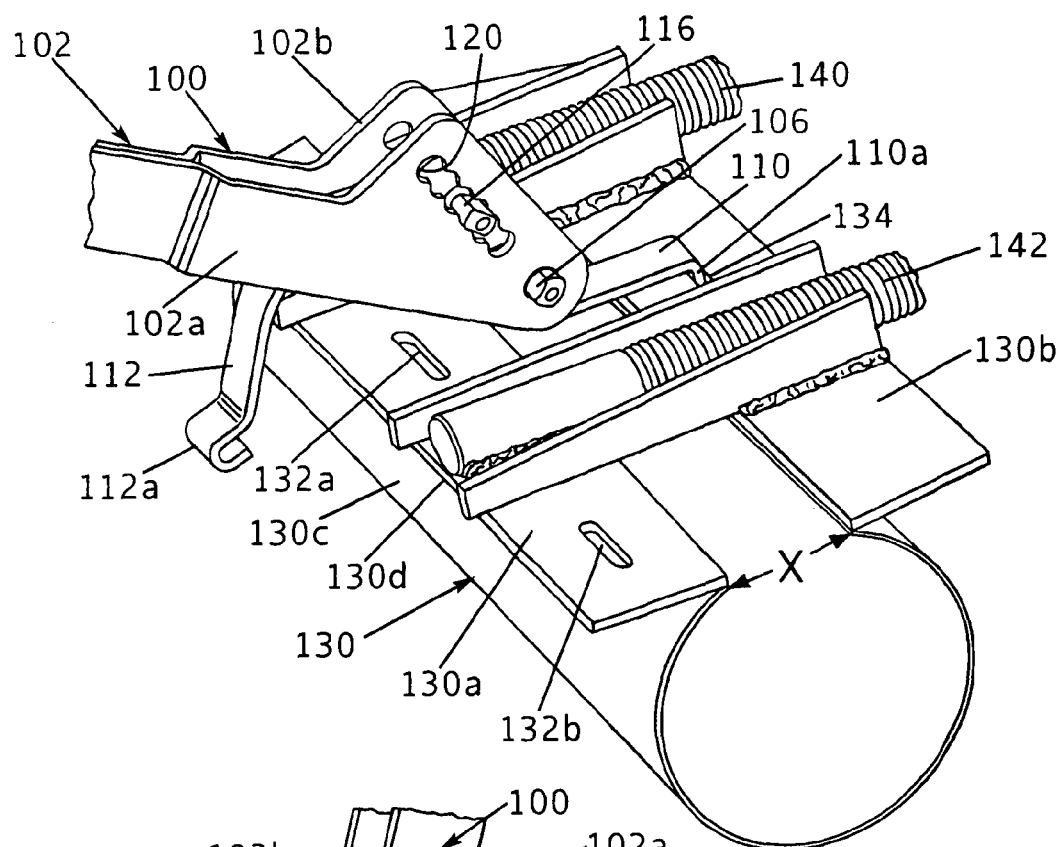
FIG. 13 is a perspective view showing the adjustable pipe repair clamp installation tool of the present invention engaging one flange of a pipe repair clamp with which the inventive tool is intended for use.
Figure 14:
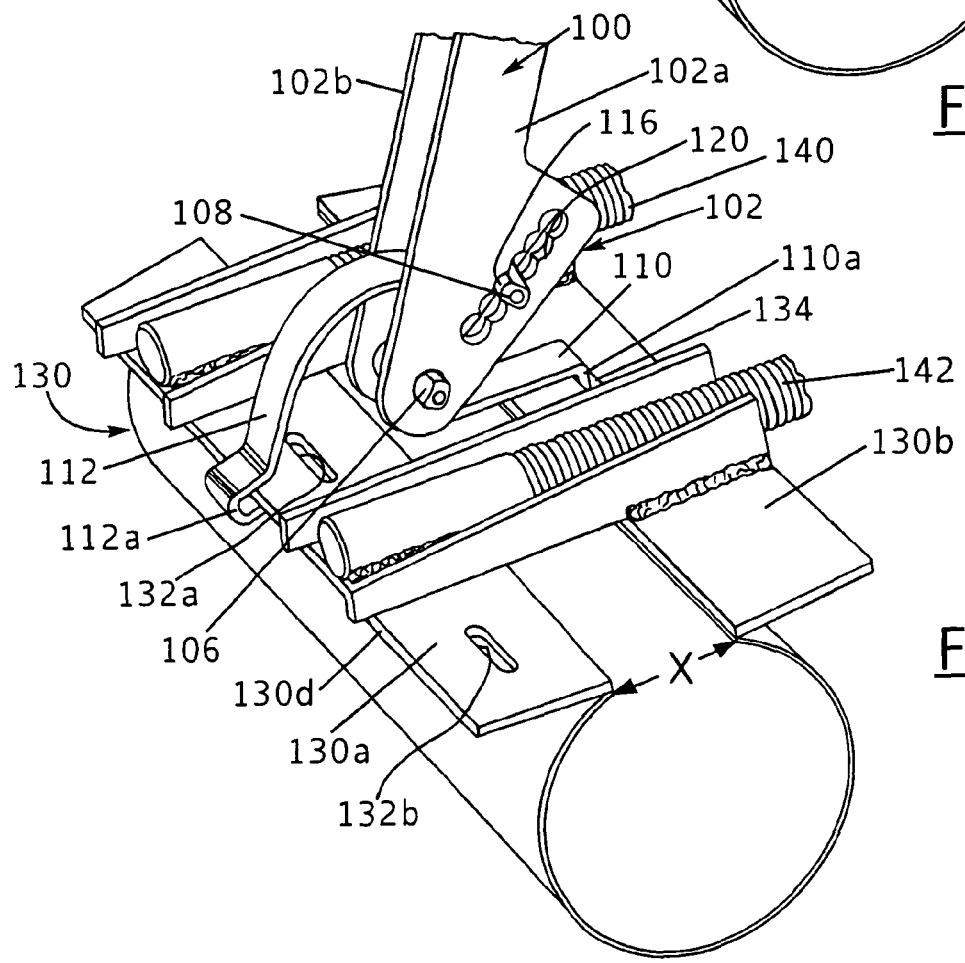
FIG. 14 is a perspective view showing the adjustable pipe repair clamp installation tool of the present invention engaging first and second flanges of a pipe repair clamp, with the tool positioned so as to begin the application of tension across the pipe repair clamp.

As shown in FIG. 13, the adjustable repair clamp installation tool 100 is first attached to a pipe repair clamp 130 having first and second edge flanges 130a and 130b by inserting the clamp end 110a of the first pivot arm 110 into an elongated, linear slot 134 disposed in the clamp's second edge flange. The first edge flange 130a of the pipe repair clamp 130 is similarly provided with one or more slots 132a and 132b which are each adapted to receive the clamp end 110a of the first pivot arm 110. This allows the adjustable repair clamp installation tool 100 to be attached across the pipe repair clamp 130 either as shown in the figures, or reoriented 180° from its position shown in these figures so as to face in the opposite direction. With the first pivot arm's clamp end 110a inserted in slot 134, the clamp end 112a of the second pivot arm 112 is positioned in engagement with the outer edge of the pipe repair clamp's first edge flange 130a as shown in FIG. 14. The second pivot arm's clamp end 112a is moved into engagement with the outer edge of the pipe repair clamp's first edge flange 130 by rotating the installation tool's central body 112 in a clockwise direction as viewed in the various figures. The adjustable repair clamp installation tool 100 pivots about the first pivot/coupling pin 106 which attaches one end of the first pivot arm 110 to an end of the installation tool's central body 102. In FIG. 13, the adjustable repair clamp installation tool 100 is shown in the fully open configuration, and the pipe repair clamp 130 is also shown fully open. In FIG. 14, initial tension has been applied across the adjustable repair clamp installation tool 100 by rotation of its central body 102 in a clockwise direction. Also in the configuration shown in FIG. 14, a compressive force of increasing magnitude is beginning to be applied across the pipe repair clamp 130 by the adjustable repair clamp installation tool 100. The spacing between the pipe repair clamp's first and second edge flanges 130a, 130b is shown as "X" in FIGS. 13 and 14.

Figure 15:
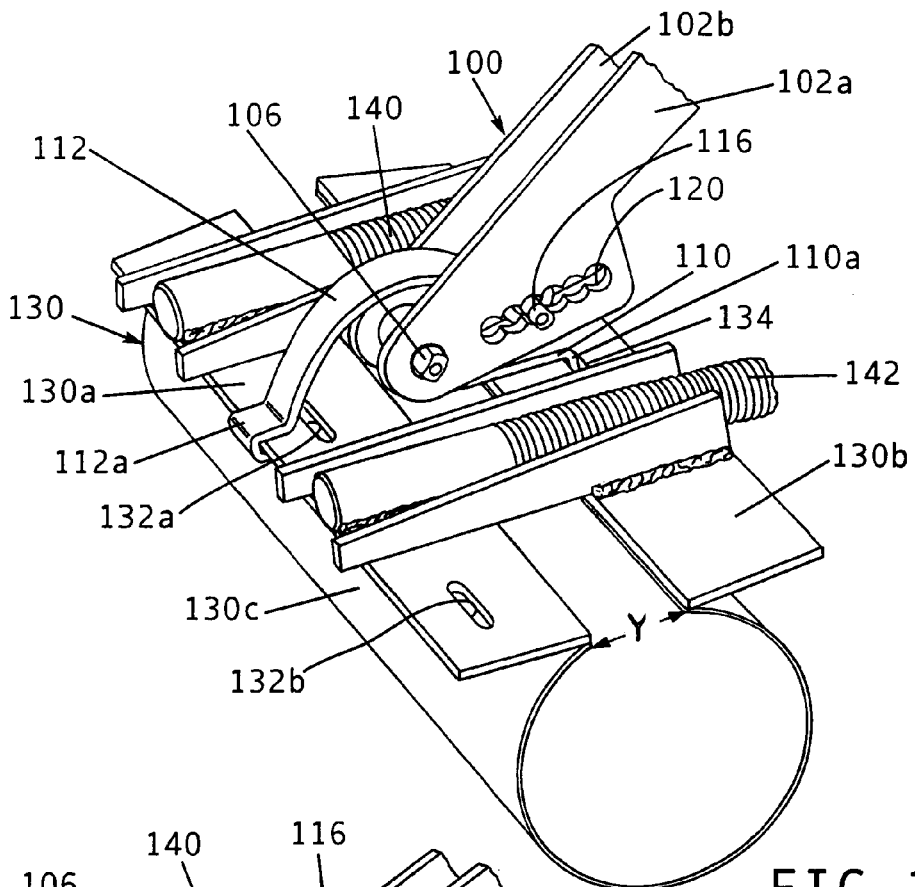
FIG. 15 is a perspective view of the inventive adjustable pipe repair clamp installation tool engaging first and second flanges of a pipe repair clamp and applying tension across the pipe repair clamp, where the tool and clamp are shown as partially closed.

Further rotation of the adjustable repair clamp installation tool 100 in a clockwise direction as shown in FIG. 15 applies increased tension across the pipe repair clamp 130 drawing its first and second edge flanges 130a, 130b further toward one another. In the configuration shown in FIG. 15, the second pivot arm's clamp end 112a firmly engages the outer edge of the pipe repair clamp's first edge flange 130a. The installation tool's central body 102 has been further rotated in a clockwise direction as viewed in FIG. 15 from its earlier position shown in FIG. 14. The increased tension applied by the adjustable repair clamp installation tool 100 across the pipe repair clamp 130 has pulled its first and second edge flanges 130a, 130b toward one another and has reduced the gap therebetween to a value "Y", where Y<X. In FIG. 15, the adjustable repair clamp installation tool 100 and the pipe repair clamp 130 are both in a partially closed configuration.

Figure 16:
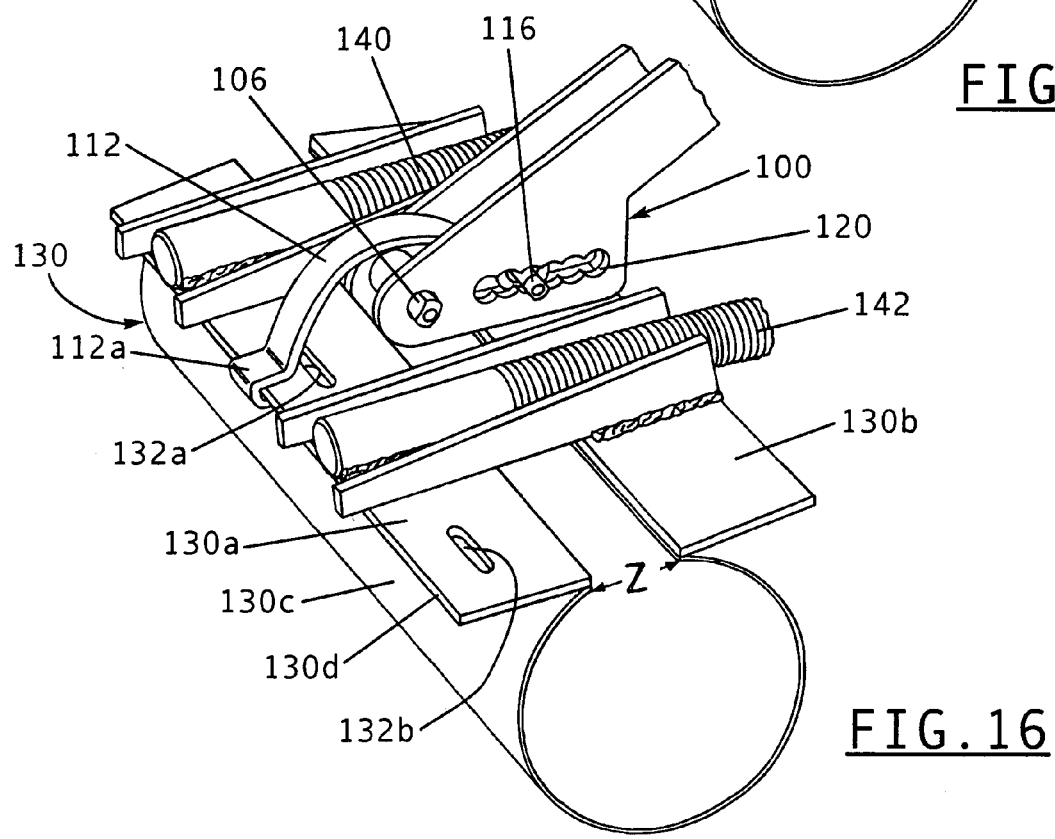
FIG. 16 is a perspective view showing the inventive adjustable pipe repair clamp installation tool engaging first and second flanges of a pipe repair clamp, where the installation tool is shown in the fully closed configuration and the pipe repair clamp is shown substantially closed about a pipe.

Referring to FIG. 16, the adjustable repair clamp installation tool 100 is shown in the fully closed configuration wherein the first and second edge flanges 130a, 130b of the pipe repair clamp 130 are further drawn toward one another, where the separation of the two flanges is shown as "Z", where Z<Y. In the configuration shown in FIG. 16, the adjustable repair clamp installation tool 100 securely engages the pipe repair clamp 130 and facilitates manual manipulation of the pipe repair clamp such as in positioning it on the desired location of the pipe being repaired. In this configuration, the pipe repair clamp 130 is loosely disposed about the pipe and can be easily moved along the length of the pipe by means of the adjustable repair clamp installation tool 100 attached to the clamp. In the configuration shown in FIG. 16, the first pivot pin 106 is disposed between the second pivot pin 108 and the second pivot arm's clamp end 112a. In addition, the second pivot arm's clamp end 112a and the first and second pivot/coupling pins 106, 108 are in generally linear alignment in the clamping configuration shown in FIG. 16. The installation tool's central body 102 has been manually displaced in a clockwise direction from its positions shown in FIGS. 13, 14 and 15 to the stop position shown in FIG. 16. In this configuration, maximum tension is applied across the pipe repair clamp's first and second edge flanges 130a, 130b, and the linear alignment of the second pivot arm's clamp end 112a and the first and second pivot/coupling pins 106, 108 provides for the stable and secure positioning of the adjustable repair clamp installation tool 100 on the pipe repair clamp 130. In order to remove the tension applied across the pipe repair clamp 130 by the adjustable repair clamp installation tool 100, the installation tool's central body 102 must be manually moved in a counter clockwise direction as viewed in FIG. 16 so that the second pivot arm's clamp end 112a and the first and second pivot/coupling pins 106, 108 are no longer in linear alignment such as shown in FIG. 13, allowing the adjustable repair clamp installation tool 100 to be removed from the pipe repair clamp 130. With the adjustable repair clamp installation tool 100 positioned on the pipe repair clamp 130 as shown in FIG. 16, with maximum tension exerted between the pipe repair clamp's first and second edge flanges 130a, 130b, a clamping bracket (not shown) attached to the first and second bolts 140 and 142 may be tightened by respective nuts (also not shown) attached to the first and second bolts for securely tightening the pipe repair clamp about the pipe. This structure and the procedure for securely and tightly attaching the pipe repair clamp 130 about the pipe was described in detail above and is shown in previously discussed FIGS. 5 and 6.

Figure 11A:
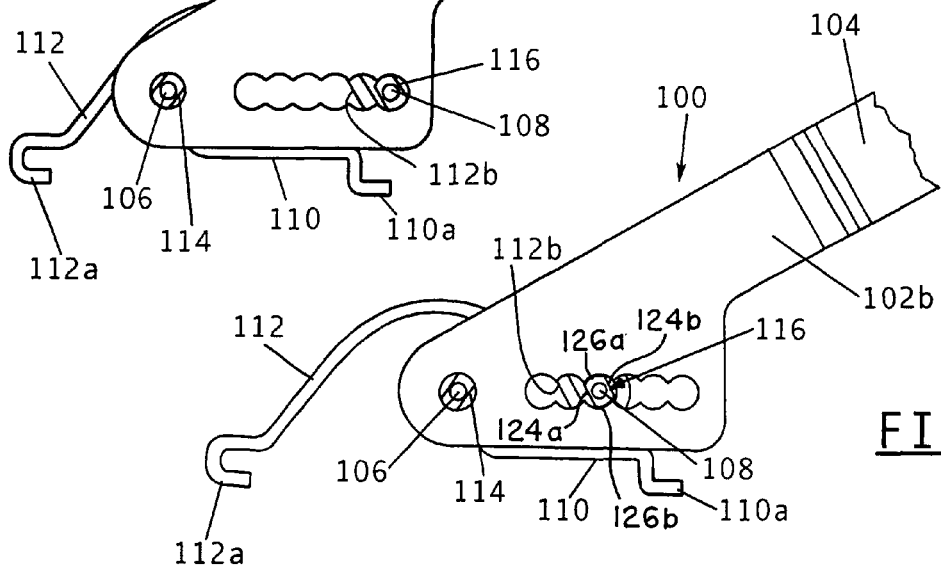
FIGS. 11a and 11b are side elevation views of the inventive adjustable pipe repair clamp installation tool shown in FIG. 10 illustrating the manner in which the size of the pipe repair clamp can be adjusted to accommodate a range of pipe repair clamp sizes and pipe diameters.
Figure 11B:
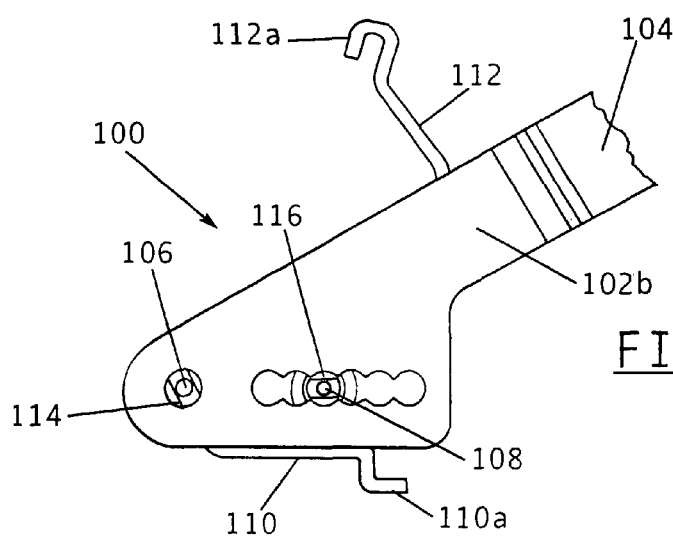

Referring to FIG. 11a, there is shown an arrangement for adjusting the size of the adjustable repair clamp installation tool 100 to accommodate a range of sizes of pipe repair clamps and pipe diameters. Shown in FIG. 11a is one end of the second pivot/coupling pin 108, it being understood that the other end of the second pivot/coupling pin is similarly configured. Disposed on each end of the second pivot/coupling pin 108 is an attaching lug 116. Attaching lug 116 is elongated in shape and includes first and second opposed flat portions 124a and 124b and first and second opposed curvilinear portions 126a and 126b. With the attaching lug 116 oriented as shown in FIG. 11a, its first and second opposed curvilinear portions 126a, 126b engage respective facing concave recesses in the elongated aperture 120 within the first elongated member 102a of the central body 102. In this configuration, the second pivot/coupling pin 108 is securely attached to the opposed concave recesses of slot 120 and is fixedly positioned within the slot. This permits tension to be applied to the second pivot arm 112 as the installation tool's central body 102 is rotationally displaced about the first pivot/coupling pin 106 in a clockwise direction as shown in the various figures and as described above. By rotating the second pivot arm 112 relative to the central body 102, the orientation of the attaching lug 116 may be changed to that shown in FIG. 11b. In FIG. 11b, the first and second flat portions 124a, 124b of the attaching lug 116 are shown in facing relation to the spaced concave recesses in the elongated aperture 120. In this configuration, attaching lug 116 may be displaced along the length of the slot 120. By changing the orientation of attaching lug 116 within slot 120, the position of the second pivot arm 112 relative to the first pivot arm 110 may be adjusted according to the size of the pipe repair clamp 130 and the diameter of the pipe being repaired. When the attaching lug 116 is located in the proper position within the slot 120 to accommodate the size of the pipe repair clamp 130, the combination of the second pivot arm 112 and second pivot/coupling pin 108 and attaching lug 116 is rotationally displaced so that the curvilinear portions 126a, 126b of the attaching lug engage facing concave recesses at the desired locations within the elongated linear slot. By moving the attaching lug 116 leftward within slot 120 as viewed in FIGS. 11a and 11b, larger pipe repair clamps and larger pipe diameters may be accommodated. Conversely, by moving the attaching lug 116 rightward within slot 120 as viewed in FIGS. 11a and 11b, smaller pipe repair clamps and smaller diameter pipes may be accommodated by the adjustable pipe repair clamp installation tool 100 of the present invention.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for installing a repair clamp on a pipe, said repair clamp including a generally cylindrical body having first and second opposed edge flanges, a slot extending the length thereof for receiving the pipe and positioning said repair clamp about an outer circumference of the pipe, and plural nut and bolt combinations coupled to said edge flanges for drawing the repair clamp tightly about the pipe, said apparatus comprising:

a body portion having first and second opposed ends;

an arm having a first end pivotally coupled to said body portion adjacent the first end thereof, said arm further including a second opposed end adapted for insertion in an aperture in the first edge flange of the repair clamp;

a clasp pivotally coupled to said body portion intermediate the first and second opposed ends thereof and adapted to engage an outer edge of the repair clamp's second edge flange when said body portion is in a first position relative to said arm and clasp and the repair clamp is loosely disposed about the pipe, wherein pivoting displacement of said body portion about said arm and clasp to a second position draws the repair clamp's edge flanges together for securely maintaining the repair clamp on and in engagement with the pipe and allowing the nut and bolt combinations to be tightened for securing the repair clamp to the pipe in a sealed manner, wherein said arm and said clasp may be disengaged and removed from the edge flanges and the apparatus removed from the repair clamp following tightening of the nut and bolt combinations; and adjustable means disposed in said body portion for coupling said clasp to said body portion and adjusting spacing between said arm and said clasp to accommodate a range of sizes of the repair clamp and diameters of the pipe.

2. The apparatus of claim 1 wherein said clasp includes a first end engaging the outer edge of the repair clamp's second edge flange and a second opposed end pivotally coupled to said adjustable means on said body portion.

3. The apparatus of claim 2 further comprising a first pivot pin coupling the second end of said clasp to said adjustable means, wherein said adjustable means includes an elongated slot disposed in said body portion and having plural engaging members disposed in a spaced manner along the length of said slot for engaging said first pivot pin and establishing spacing between said arm and said clasp.

4. The apparatus of claim 3 wherein each of said engaging members includes a pair of concave recesses in facing relation within said elongated slot, with plural pairs of facing concave recesses disposed in a spaced manner along the length of said elongated slot, and wherein each pair of facing concave recesses securely engages said first pivot pin in a releasable manner.

5. The apparatus of claim 4 wherein said clasp includes a first hook disposed on its first end for engaging the outer edge of the repair clamp's second edge flange and a second hook disposed on its second opposed end and positioned about said first pivot pin.

6. The apparatus of claim 4 wherein said first pivot pin includes a first pair of opposed convex portions and a second pair of opposed flat portions disposed in an alternating manner about its circumference, and wherein said convex portions are adapted for secure engagement with opposed facing pairs of concave recesses in said elongated slot for fixedly coupling said clasp to said body portion, and wherein said first pivot pin is movable along the length of said slot for repositioning said first pivot pin within said slot when the opposed flat portions of said first pivot pin are in facing relation to the opposed convex portions of said slot.

7. The apparatus of claim 6 wherein said body portion includes first and second connected members forming a handle at respective first connected ends thereof.

8. The apparatus of claim 7 wherein second opposed ends of said first and second members are arranged in a spaced manner from each other and wherein said arm and said clasp are disposed between said first and second members adjacent the second ends thereof.

9. The apparatus of claim 8 further comprising a second pin pivotally coupling said arm to said body portion, wherein said first and second pins are disposed between and coupled to said first and second members.

10. The apparatus of claim 8 wherein said adjustable means further includes first and second elongated linear slots respectively disposed in said first and second members with each of said slots having plural engaging members disposed in a spaced manner along the respective lengths thereof, and wherein the engaging members in said first slot engage a first end of said second pivot pin and the engaging members in said second slot engage a second opposed end of said second pivot pin.

11. The apparatus of claim 1 wherein said arm and said clasp are disposed in closely spaced, aligned relation when said body portion is pivotally displaced to said second position.

12. The apparatus of claim 1 further comprising a handle disposed on the second end of said body portion.

13. The apparatus of claim 12 wherein said handle is comprised of rubber or an elastomeric material.

14. The apparatus of claim 1 wherein the second end of said arm includes a hook structure for insertion into the aperture when said body portion is in said first position, and wherein said hook structure cannot be removed from the aperture when said body portion is in said second position for locking the repair clamp in position on the pipe.

15. The apparatus of claim 14 wherein said aperture is in the form of a slot and said hook structure includes first and second coupled flat portions having approximately 90° relative orientation.

16. The apparatus of claim 1 wherein said clasp is generally C-shaped and includes an elongated slot for engaging an outer edge of the repair clamp's second edge flange.

17. The apparatus of claim 1 wherein said apparatus is comprised of high strength steel.

18. The apparatus of claim 1 further comprising first and second pins attached to said body portion for pivotally coupling said clasp and arm, respectively, to said body portion, and wherein said second pin forms an axis of rotation about which said body portion rotates when moved between said first and second positions.

19. The apparatus of claim 18 wherein said first and second pins and an end portion of said clasp engaging an outer edge of the repair clamp's second edge flange are in general linear alignment when said body portion is in said second position.

20. The apparatus of claim 19 wherein the body portion is pivotally displaced about said second pin in moving said body portion from said first to said second position in removing said apparatus from the repair clamp.

21. Apparatus for installing a repair clamp on a pipe, said repair clamp including a generally cylindrical body having an inner liner and first and second opposed edge flanges, a slot extending the length thereof for receiving the pipe and positioning said repair clamp about an outer circumference of the pipe, and plural nut and bolt combinations coupled to said edge flanges for drawing the repair clamp tightly about the pipe, said apparatus comprising:

an elongated body having first and second opposed ends and an intermediate portion disposed therebetween;

an arm having a first end pivotally coupled to said body adjacent the first end thereof by means of a first pivot pin and a second opposed end adapted for insertion in an aperture in the first edge flange of the repair clamp;

a clasp pivotally coupled by means of a second pivot pin to said body intermediate the first and second opposed ends thereof and adapted to engage an outer edge of the repair clamp's second edge flange when said body is in a first position relative to the repair clamp and the repair clamp is loosely disposed about the pipe, wherein pivoting displacement of said body about said first pivot pin in a direction away from the repair clamp's second edge flange to a second position relative to the repair clamp draws the second end of said arm and said clasp as well as the repair clamp's first and second edge flanges together, and wherein the inner liner and cylindrical body of the repair clamp are securely maintained in engagement with the pipe about its outer periphery allowing the nut and bolt combinations to be tightened for securing the pipe clamp to the pipe in a sealed manner, wherein said arm and said clasp may be disengaged and removed from the edge flanges and the apparatus removed from the repair clamp following tightening of the nut and bolt combinations; and adjustable coupling means disposed in said elongated body for coupling said clasp to said elongated body while allowing for changing spacing between said arm and said clasp to accommodate a range of sizes of the repair clamp and diameters of the pipe.

22. The apparatus of claim 21 wherein said body includes first and second spaced, generally parallel members, with said first and second pins disposed between and coupled to said first and second members.

23. The apparatus of claim 21 further comprising a handle disposed on the second end of said body.

24. The apparatus of claim 23 wherein said handle is comprised of rubber or an elastomeric material.

25. The apparatus of claim 21 wherein the second end of said arm includes a hook structure for insertion into the aperture when said body is in said first position, and wherein said hook structure cannot be removed from the aperture when said body is in said second position for locking the repair clamp in position on the pipe.

26. The apparatus of claim 25 wherein said aperture is in the form of a slot and said hook structure includes first and second coupled flat portions having generally 90° relative orientation.

27. The apparatus of claim 21 wherein said clasp is curvilinear in shape having a first end coupled to said second pivot pin and a second opposed end engaging the outer edge of the repair clamp's second edge flange.

28. The apparatus of claim 27 wherein the second end of said clasp is generally in the form of a hook.

29. The apparatus of claim 21 wherein said apparatus is comprised of high strength steel.

30. The apparatus of claim 21 wherein said first pin forms an axis of rotation about which said body rotates when moved between said first and second positions.

31. The apparatus of claim 27 wherein said first and second pins and the second end of said clasp are in general linear alignment when said body is in said second position.

32. The apparatus of claim 21 wherein said adjustable means changes spacing between said arm and said clasp, bringing said arm and clasp closer together for smaller pipe clamps and pipe diameters and moving said arm and clasp apart for larger pipe clamps and pipe diameters.

33. The apparatus of claim 32 wherein said clasp includes a first end engaging the outer edge of the repair clamp's second edge flange and a second opposed end pivotally coupled to said second pivot pin.

34. The apparatus of claim 33 wherein said adjustable means includes an elongated slot disposed in said body portion and having plural engaging members disposed in a spaced manner along the length of said slot for engaging said first pivot pin and establishing spacing between said arm and said clasp.

35. The apparatus of claim 34 wherein each of said engaging members includes a pair of concave recesses in facing relation within said elongated slot, with plural pairs of facing concave recesses disposed in a spaced manner along the length of said elongated slot, and wherein each pair of facing concave recesses securely engages said first pivot pin in a releasable manner.

36. The apparatus of claim 35 wherein said clasp includes a first hook disposed on its first end for engaging the outer edge of the repair clamp's second edge flange and a second hook disposed on its second opposed end and positioned about said second pivot pin.

37. The apparatus of claim 35 wherein said second pivot pin includes a first pair of opposed convex portions and a second pair of opposed flat portions disposed in an alternating manner about its circumference, and wherein said convex portions are adapted for secure engagement with opposed facing pairs of concave recesses in said elongated slot for fixedly coupling said clasp to said body portion, and wherein said second pivot pin is movable along the length of said slot for repositioning said first pivot pin within said slot when the opposed flat portions of said first pivot pin are in facing relation to the opposed convex portions of said slot.

38. The apparatus of claim 37 wherein said body portion includes first and second connected members forming a handle at respective first connected ends thereof.

39. The apparatus of claim 38 wherein second opposed ends of said first and second members are arranged in a spaced manner from each other and wherein said arm and said clasp are disposed between said first and second members adjacent the second ends thereof.

40. The apparatus of claim 39 wherein said arm and said clasp are disposed in closely spaced, aligned relation when said body portion is pivotally displaced to said second position.

* * * * *